Sept. 20, 1971     P. SALERNO ET AL     3,605,251

METHOD AND DEVICE USED IN INSTALLING CABLES IN CONDUITS

Filed March 27, 1970     2 Sheets-Sheet 1

INVENTORS
Phillip Salerno
Michael Sammaritano
BY Frank J. Jordan
ATTORNEY

INVENTORS
Phillip Salerno
Michael Sammaritano

BY Frank J. Jordan

ATTORNEY 3,605,251
METHOD AND DEVICE USED IN INSTALLING CABLES IN CONDUITS
Phillip Salerno, Brooklyn, and Michael Sammaritano, Bayshore, N.Y., assignors of fractional part interest to Angelo Raffa
Filed Mar. 27, 1970, Ser. No. 23,346
Int. Cl. B23p 19/04
U.S. Cl. 29—433                                    3 Claims

ABSTRACT OF THE DISCLOSURE

A conduit in which an electrical cable or the like is to be installed has rupturable containers of lubricant installed therein. The containers are broken as the electrical cable is passed through the conduit thereby to release the lubricant in the conduit and reduce the friction of the electrical cable and otherwise facilitate pulling of the cables through the conduit.

BACKGROUND OF THE INVENTION

Construction of electrical facilities in buildings, and underground in city streets, public facilities, military installations an the like involves initially installing a conduit which is to house the electrical cable. After the conduit is installed, a snake such as a long length of fiber glass or spring steel is pushed through the conduit and is used to pull a wire or nylon rope through the conduit. The end of an electrical cable is secured to one end of the rope and the other end of the latter is pulled through, thereby pulling the length of cable into the conduit where its ends are ultimately hooked up in junction boxes or other devices and equipment to complete the electrical installation.

Frequently, the conduit has a tortuous path formed by fittings, usually 45 and 90 degree elbows, so that it requires a large pulling force to pull the electrical cable through the conduit. The more fittings in a particular section of conduit, the more tortuous the path and the greater the pulling force required. Frequently, the printing on the cable insulation is worn away upon being pulled through a length of conduit. On other occassions cables have broken or conduit fittings have been damaged or broken because of the large pulling forces exerted on the cable in attempting to install the latter on a conduit. Also as a result of these large pulling forces, the cable is stretched such that the thickness of the insulation is reduced with resultant reduction in the effectiveness of the insulation.

In order to reduce the pulling force required, pulling boxes are installed at more frequent intervals (in many cases every 100 feet, for example) but this adds to the over-all costs. In some cases electrical code requirements are such that there is a limitation on the number of bends in a run of conduit between outlet and outlet. For example, the National Electrical Code. Article 347–14 provides that for rigid monmetallic conduit, a run of conduit between outlet and outlet, between fitting and fitting or between outlet and fitting shall not contain more than the equivalent of four quarter bends (360 degrees) total including those bends located immediately at the outlet or fitting.

In other installations, the limit of the length of cable which may be pulled in a run of conduit is limited by the friction from the weight of the cable.

Heretofore, a lubricant in the form of a light cream having dielectric properties, frequently referred to as pulling compound, has been packed at the leading end of the electrical cable just before it was about to be pulled through a conduit. However, the pulling compound tended to dissipate rapidly at the initial end of the conuit run and there was no effective lubrication at the remaining portion of the conduit run.

Accordingly, it is an object of the present invention to provide a method to ameliorate the aforesaid conditions and disadvantages and to provide an improved method for installing electrical cable and the like in a conduit.

Another object is to provide a method of installing electrical cable wherein pulling lubricant is distributed throughout the length of the conduit to reduce the friction as the cable is pulled and to otherwise facilitate electrical cable installation.

Another object is to provide for reducing the pulling forces required to pull a cable through a conduit and for protecting the cable from abrasion as the cable is pulled through a conduit.

Another object is to provide for introducing a source of pulling lubricant at frequent intervals along a run of conduit.

Another object is to provide for distributing pulling lubricant throughout the length of a conduit whereby the lubricant need not be used and distributed in the conduit until the cable is ready to be pulled therethrough.

A further object is to provide for distributing lubricant in a conduit which is to be installed in an inaccessible location (e.g. underground) and in which the electrical cable is not to be placed in the conduit until a future date.

SUMMARY OF THE INVENTION

The aforesaid objects of the present invention and other objects which will become apparent as the description proceeds, are achieved by disposing a plurality of container means containing a lubricant along a plurality of longitudinally spaced locations along the inside of the conduit, passing a leading portion of said elongated member through said conduit, engaging said container means with said elongated member to cause the container means to release the lubricant therein, and passing said elongated member through said conduit as the released lubricant functions as a lubricant to facilitate passing said elongated member through the conduit.

Numerous other objects and advantages of the invention will become apparent as it is better understood from the following description, which, taken in connection with the accompanying drawings, discloses a preferred embodiment.

DESCRIPTION OF THE PREFERRED EMBODIMENTS

Before explaining the present invention in detail, it is to be understood that the invention is not limited in its application to the details of construction and arrangement of parts illustrated in the accompanying drawings since the invention is capable of other embodiments and of being practiced or being carried out in various ways. Also it is to be understood that the phraseology or terminology employed is for the purpose of description and not of limitation.

Figure 1:
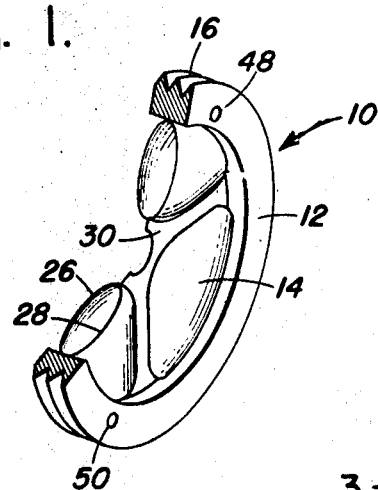
FIG. 1 is a perspective view, partly broken away, of a container means according to one embodiment of the invention in which a plurality of containers containing lubricant are secured to a ring element.

Referring to the drawings in which like parts are similarly designated, FIG. 1 shows a container means 10 which comprises, according to the one embodiment of the invention, a ring element 12 on which a plurality of bags or containers 14 containing lubricant are mounted. The ring element 12 is externally threaded as indicated at 16 and is adapted to be threadedly received by the internal thread 18 of a coupling 20. The coupling 20 in turn threadedly receives the longitudinal ends of two conduits 22, 24 which are adapted to receive and house one or more electrical cables. As will be described in greater detail hereinafter, the bags 14 are adapted to be ruptured in the process of pulling the electrical cables through the conduit thereby to release the lubricant into the conduit and lubricate the latter and the cables to reduce the friction therebetween as the cable is pulled through the conduit during installation.

The container means 10 may be formed by two sheets of flexible material 26, 28 (e.g. plastic such as polyethylene) between which are formed a plurality of compartments which define the aforementioned compartments 14. The individual compartments 14 are, separate and sealed by peripheral webs 30 which may be formed by heat sealing the two sheets 26, 28 of material to one another. The ring 12 may be made of plastic and the outer radial ends or web of the two sheets of flexible material 26, 28 are suitably secured to the ring 12 by heat sealing to the inner surface of the ring 12. Alternatively, the outer radial ends of the two sheets of material 26, 28 may be clamped between two split rings (not shown) which together are equivalent to the ring 12. Also the compartments 14 may be replaced by a single compartment in the shape of a doughnut.

An opening 32 concumscribed by the web 30 may be provided in the center of the container means 10 so as not to completely block the conduit. The opening 32 eliminates sealed compartments in the conduit and permits drainage of any water which may have entered the conduit before the electrical cables are installed. It will be observed that the construction of the container means 10 is such that the bags or containers 14 are suspended and supported in the conduit so as to close off the latter except for the opening 32.

Figure 3:
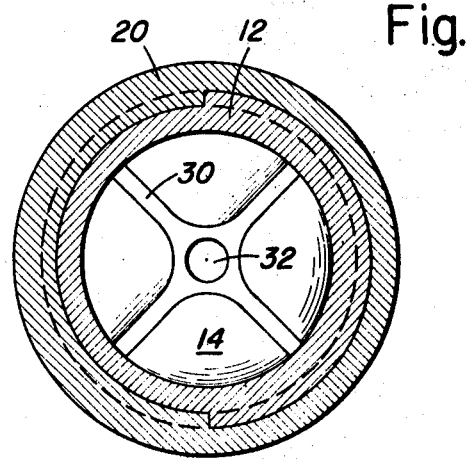
FIG. 3 is a sectional view taken along the line 3—3 of FIG 2.
Figure 2:
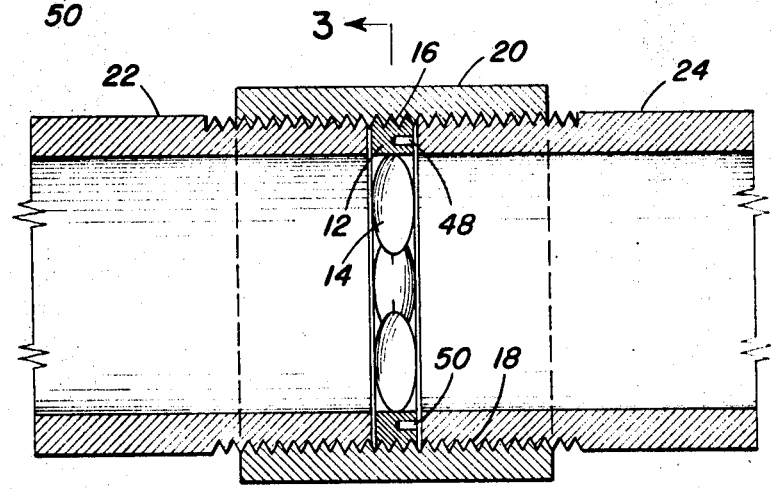
FIG. 2 is a sectional view of a coupling in which the container means of FIG. 1 is installed.
Figure 4:
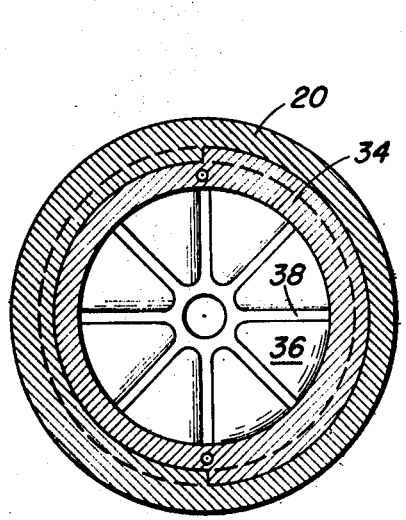
FIG. 4 is a sectional view, similar to FIG. 3, but showing an alternate embodiment wherein a larger number of bag compartments are included on the container means.

In the embodiment of FIGS. 1 to 3, the container means 10 is shown as comprising four containers 14. However, any number of containers 14 may be used. The alternate embodiment in FIG. 4, for example, shows a ring 34 on which eight separate bags or containers 36 are formed, each container 36 being separated by a web 38.

Figure 5:
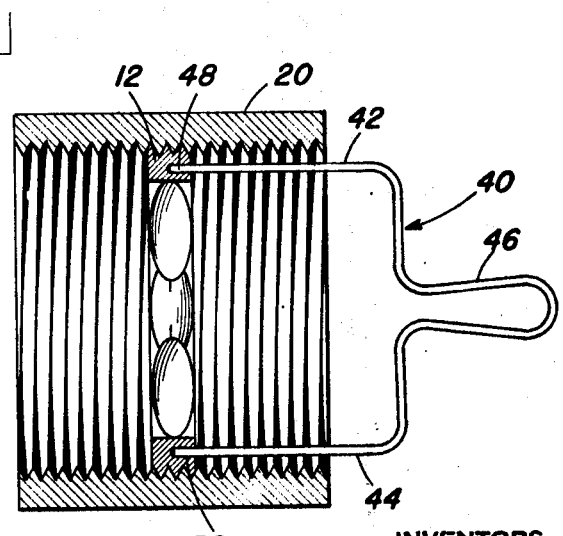
FIG. 5 is a sectional view of a coupling showing an insertion tool to facilitate inserting the container means in the coupling.

In order to facilitate insertion of the container means 10 within the coupling 20, an insertion tool 40 may be used. The insertion tool 40 consists of a generally U-shaped part having two legs 42, 44 which extend from a handle 46. The ends of the legs 42, 44 are adapted to fit into suitable openings 48, 50 in the sides of the ring 12 as shown in FIG. 5 so that rotation of the handle 40 will in turn rotate the ring 12.

In some installations, for example in laundries, the conduit for the electrical cables must be waterproof. In such installations, the ring 12 may serve as a gasket to provide a watertight seal at the ends of the two conduits 22, 24. In this regard, the two conduits 22, 24 may be threaded into the coupling 20 to the extent of compressing the ring 12, which may be made of plastic, therebetween to provide the watertight seal.

Frequently, in known conventional installations which do not employ any type of ring between the longitudinal ends of the two conduits in a coupling, the ends of such conduits do not come together or they do not abut one another evenly around the periphery thereof. This results in a gap in the coupling between the two conduit ends and this gap can frequently be troublesome, for example, by catching the end of the snake as the latter is attempted to be pushed through a run of conduit. According to the present invention, the ring 12, which may also serve as a gasket as previously mentioned, also serves to eliminate any gap between the longitudinal ends of the conduits 22, 24 which might otherwise hinder insertion of the snake.

Figure 6:
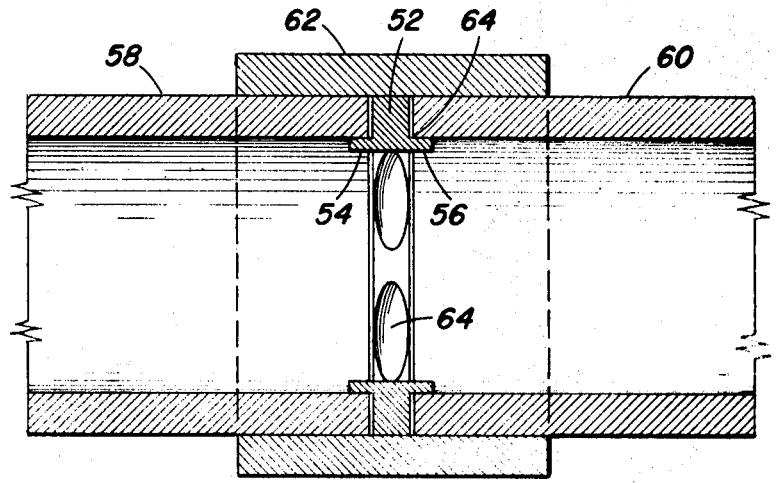
FIG. 6 is a sectional view of an alternate embodiment wherein the ring element on which the containers are mounted has annular flanges extending into the ends of the conduits.

FIG. 6 shows an alternate embodiment in which a container means comprises a ring 52 having inner, annular flanges 54, 56 which extend into the ends of conduits 58, 60. The ring 52 is carried in a non-threaded coupling 62 between the ends of the conduits 58, 60 and supports a plurality of containers 64 containing lubricant. It will be observed that the flanges 54, 56 cover the ends of each conduit 58, 60. In this regard it will be noted that when a length of conduit is cut, the cutting tool tends to leave a sharp edge or burrs on the edges of the cut conduit, particularly the inner edge because the cutting tool cuts radially inwardly. This is true, for example, of a conventional three-ring cutting tool which tends to leave a sharp inner edge on the cut pipe. For this reason, conventional three ring cutting tools are not permitted to be used on many installations because the sharp inner edge will cut or otherwise damages the electrical cable which is pulled through and housed in the conduit.

It will be seen in FIG. 6, that flanges 54, 56 cover the inner peripheral edges 64 of the conduits 58, 60 thereby protecting the electrical cables in the conduits from being cut or otherwise damaged by any sharp edge or burrs on said inner peripheral edge 64. Because of this protection, conventionally a three ring cutting tool may be used to cut the conduit where heretofore they were not permitted for the reasons stated above.

Figure 7:
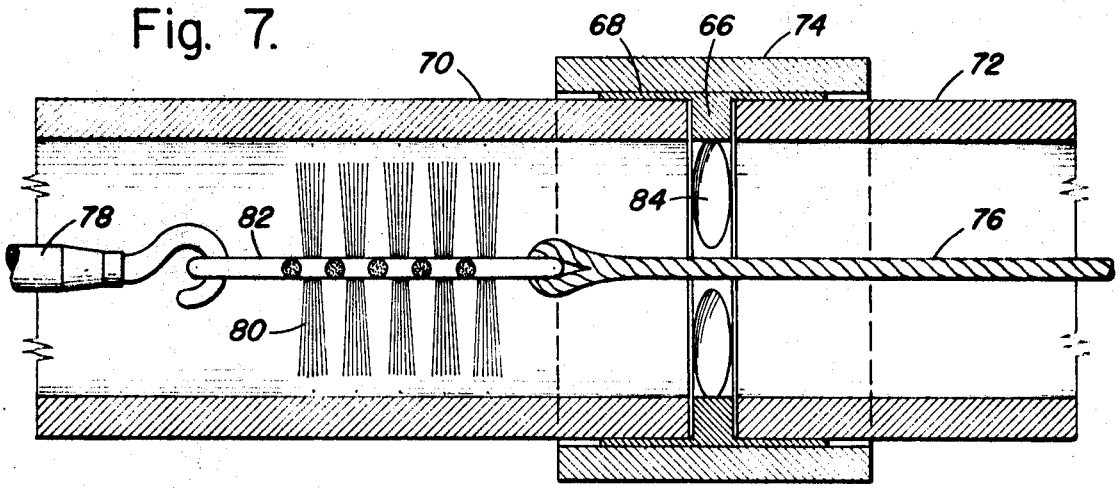
FIG. 7 is a sectional view of an alternate embodiment wherein the ring element on which the containers are mounted has tabs extending into the space between the coupling and the ends of the conduits.
Figure 8:
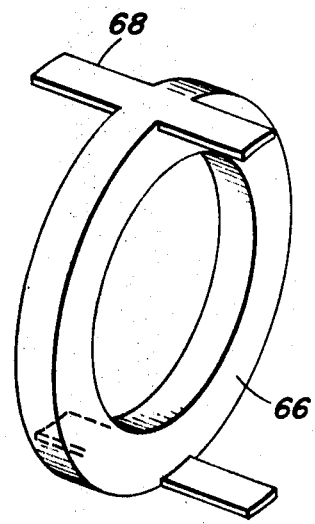
FIG. 8 is a perspective view of the ring element with tabs used in the embodiment of FIG. 7.

FIGS. 7 and 8 show a further alternate embodiment wherein the container means comprises a ring 66 having a plurality of tabs 68 extending generally parallel to the centerline of the ring 66. The tabs 68 are relatively thin and are adapted to extend into the narrow annular space between the outer walls of conduits 70, 72 and the inner walls of a non-threaded coupling 74 which joins the two conduits 70, 72. The tabs 68 serve to anchor the ring 66 in place in the coupling 74 between the ends of the two conduits 70, 72.

FIG. 7 further shows a pulling cable or rope 76 which is used to pull an electrical cable 78 through the conduit. A wire brush 80 having a central support 82 is disposed between the pulling cable or rope 76 and the electrical cable 78. It will be seen that as the electrical cable 78 is pulled through the conduit, the brush 80 precedes the electrical cable 78 to rupture or break the containers 84. In this regard it will be appreciated that when the snake is initially passed through the conduit and the snake is used to pull through the pulling cable or rope 76, various containers 84 may be broken by the snake and the wire or nylon rope 76 and that the brush 80 will break or rupture the containers 84 not previously broken. The brush 80 will also tend to spread and distribute the lubricant along the longitudinal extent of the conduit.

Figure 9:
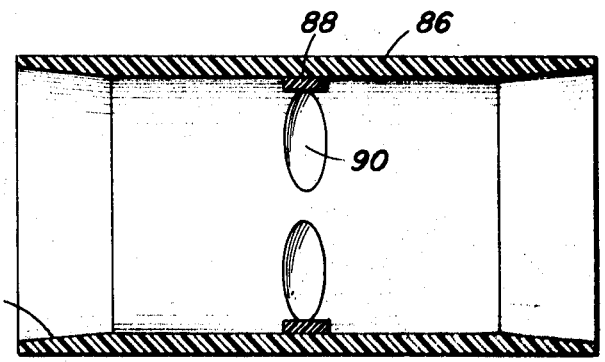
FIG. 9 is a sectional view of an alternate embodiment in which a ring element is secured to the inside walls of a coupling.

In the embodiment of FIG. 9, a coupling 86 has affixed therein a container means comprising a ring 88 carrying a plurality of bags or compartments 90 of pulling lubricant. The coupling 86 may have internally tapered ends 92 adapted to receive the ends of conduits which are joined by the coupling 86. The coupling 86 may be made of a fiber material, plastic (e.g. polyvinylchloride, Bakelite), asbestos cement, porcelain, transite steel and the like. The ring 88 may be suitably secured to the inside wall of the coupling 86, for example by heat sealing, fusing, or welding. The ring 88 with the containers 90 may be affixed in place in the coupling 86 at the manufacturing facility rather than at the job site. The coupling 86 shown in FIG. 9 may be used, for example, in connecting the individual ducts in the underground, preformed conduit sections, each of which has a plurality of ducts, disclosed in our co-pending U.S. patent application Ser. No. 847,342 filed Aug. 4, 1969 and Ser. No. 808,452 filed Mar. 19, 1969.

It will be appreciated that the container means of the present invention may be readily installed at each coupling within a run of conduit. Accordingly, there is assured an adequate distribution of pulling lubricant throughout the length of the conduit. For example, conduits for electrical installations are frequently supplied in 10 foot lengths and a coupling is installed between each such 10 foot length so that there may be a source of pulling lubricant at a minimum of every 10 feet. Where fittings (e.g. elbows) are installed, couplings adjacent the fittings may be provided with lubricant containers of the present invention to lubricate the area inside the fittings where the greatest friction is encountered.

In electrical construction, frequently conduits are installed at a facility (e.g. underground or in the walls of a building) in which electrical cables are to be installed at a future date, for example, to provide for expansion. Accordingly, long runs of such conduits are unaccessible. However, according to the present invention, the lubricant container means of the present invention may be installed in the conduit as the latter is installed at the construction site and may be allowed to remain in the conduit in the containers until some future date when the electrical cable is passed therethrough to rupture the containers and release the lubricant.

From the above description it will be seen that there has been described a method and device for installing electrical cable in a conduit which reduces friction, which reduces abrasion and the wear and tear of the electrical cable, which reduces the over-all cost of an electrical installation, which leads towards the reduction in the number of pull boxes and towards reducing the maximum size of cables which may be installed through a particular size conduit, towards a reduction in the number of splices required, towards an increase in the number of turns which may be safely used in a particular run of conduit, and which provides numerous other benefits and advantages heretofore set forth.

It is though that the invention and many of its attendant advantages will be understood from the foregoing description and it will be apparent that various changes may be made in the form, construction and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

What is claimed is:

1. A method of assembling a cable member within a conduit, comprising the steps of securing a plurality of frangible container means containing a lubricant at a plurality of longitudinally spaced locations along the inside of said conduit, passing a leading portion of said cable member attaching a pulling means including a distributing element to said cable member, into said conduit, engaging said container means with said pulling means to cause the container means to fracture whereby to release the lubricant therein and to cause said distributing element to distribute the released lubricant on the conduit surface and continuing to pass said cable member through said conduit as the released lubricant functions as a lubricant to facilitate assembling said cable member within the conduit.

2. A method according to claim 1 wherein said cable member is an electrical cable and said conduit is made up of sections joined to one another by fittings, said container means being secured in place at said fittings.

3. A method according to claim 1 wherein said container means comprise sealed packages made of flexible material.

References Cited

UNITED STATES PATENTS

| | | | |
|---|---|---|---|
| 559,184 | 4/1896 | Marshall | 43—117X |
| 848,865 | 2/1907 | Stover | 43—117 |
| 2,522,071 | 9/1950 | Tait | 118—404X |
| 2,597,706 | 5/1952 | Couchman | 174—68C |
| 2,666,354 | 1/1954 | Dim et al. | 29—526UX |
| 2,767,239 | 10/1956 | Kennedy | 174—68C |
| 2,924,876 | 2/1960 | Lewis | 29—458 |
| 3,023,599 | 3/1962 | Pellegrini | 118—404X |
| 3,140,958 | 7/1964 | Opotow et al. | 29—526UX |
| 3,467,120 | 9/1969 | Hill et al. | 285—3X |

FOREIGN PATENTS

| | | | |
|---|---|---|---|
| 145,796 | 1938 | Germany | 118—404 |

MORRIS KAPLAN, Primary Examiner

U.S. Cl. X.R.

29—624; 118—408; 138—108; 174—68C; 285—3